3,049,455
ADHESIVES FOR BONDING POLY 1-OLEFINS TO METALS
Robert T. Werkman and Peter J. Canterino, Bartlesville, Okla., assignors to Phillips Petroleum Company, a corporation of Delaware
No Drawing. Filed Sept. 27, 1957, Ser. No. 686,604
9 Claims. (Cl. 154—43)

This invention relates to adhesive compositions. In one of its aspects, this invention relates to a novel adhesive for bonding 1-olefin polymers to metals. In a second aspect, this invention relates to a halogenated high density, highly crystalline ethylene polymer containing between 20 and 60 weight percent halogen as an adhesive composition.

Polyolefins are well known in the art as bonding compositions, as coatings, wrappings and the like. Such materials would be ideally suited as coating for metals and the like. However, they have not been as extensively used as might otherwise have been the case due to the fact that they are somewhat difficult to bond to metals such as iron, steel, copper, brass, aluminum and nickel.

It has now been discovered that chlorinated or brominated high density, highly crystalline ethylene polymers containing between 20 and 60 weight percent halogen, when dissolved or dispersed in a suitable organic medium are excellent adhesives for bonding solid polyolefins to metals. The halogenated polymers may contain curative and/or fillers such as carbon black, or metal fillers if desired.

It is an object of this invention to provide an adhesive for bonding 1-olefin polymers to metals.

It is another object of this invention to provide a metal bonded to such 1-olefin polymers.

Still other objects, advantages and features of this invention will be apparent to those skilled in the art having been given this disclosure.

According to this invention, a halogenated high density, highly crystalline ethylene polymer, containing between 20 and 60 weight percent halogen selected from the group consisting of chlorine and bromine when dissolved or dispersed in a suitable organic medium, is utilized as bonding agent for bonding 1-olefin polymers to metals. Those polymers containing less than about 20 weight percent halogen are not sufficiently firm to act as adhesive whereas those polymers containing more than about 60 weight halogen are too resinous to form a firm bond.

The 1-olefin polymers to be bonded by the method of this invention are well known in the art. They may be of the older high pressure polymers or they may be of the newer developed catalytic polymerized 1-olefin polymers. Examples of such polymers include, for example, polymers of ethylene, 1-butene, 1-hexene, 1-octene, 4-methyl-1-pentene, 4-methyl-1-hexene, 4-ethyl-1-hexene, 6-methyl-1-heptene, 5-methyl-1-heptene and the like. These materials can be polymerized alone or in admixture with each other or they may be polymerized with other aliphatic olefins such as butene-2 and butadiene.

Such bonded compositions of the olefin polymer to the metal are useful such as tank linings, pipe lining, electrical insulating materials such as on wire and cable, thermal insulation such as bonding foamed polymer to metal and similar uses.

A highly satisfactory and often preferred highly crystalline olefin polymer to be halogenated can be obtained by the process set forth in the copending application of Hogan and Banks, Serial No. 573,877, now U.S. 2,825,721, filed March 26, 1956. According to that application polymers are produced by polymerizing 1-olefins having a maximum chain length of 8 carbon atoms and no branching nearer the double bond than the 4-position, by contacting with a solid catalyst containing as an essential catalytic ingredient chromium oxide associated with at least one porous oxide selected from the group consisting of silica, alumina, zirconia, and thoria. Liquid phase or vapor phase operation may be employed. A highly satisfactory method involves contacting the monomer in the presence of a hydrocarbon diluent in liquid phase with a suspended comminuted catalyst of the type described by Hogan and Banks. It is preferred that the chromium content of the catalyst be in the range of 0.5 to 10 weight percent and that an appreciable proportion of the chromium be in the hexavalent state. This catalyst is generally activated under non-reducing conditions, preferably by contacting with an oxidizing gas such as air at high temperatures, e.g., 700 to 1000° F. prior to use. By one method of operation the polymerization is carried out in a solvent such as cyclohexane at a temperature above the solution temperature of the polymer being formed, e.g., 250–375° F. In the copending application of Leatherman and Detter, Serial No. 590,567, filed June 11, 1956, a process is described wherein the polymerization is carried out in a solvent such as pentane at a temperature below the solution temperature thereby forming polymer of discrete particles. In any case, the polymer is separated from the diluent by filtration, hydrocarbon flashing, steam distillation, or the like. Polyethylene produced by such a process will ordinarily have a molecular weight in the range 35,000 to 100,000, a density in the range 0.95 to 0.97, e.g., approximately 0.96, and a crystallinity in the range 90 to 95 percent. The tensile strength of the polymer as produced will ordinarily be of the order of 4000 to 5000 p.s.i., but can be higher or lower. The polymer ordinarily has a melting point of approximately 250–255° F. and a softening point of about 265° F. or higher. The difference between melting point and softening point is due to the difference in methods by which these values are obtained as is known by those skilled in the polymer art. Polymers produced by these processes have unsaturation which is preponderantly of the terminal vinyl and/or trans-internal structure. So-called "branch vinyl" unsaturation is substantially absent. These terms are more fully discussed in the cited Hogan and Banks application.

Another suitable but non-equivalent method of producing highly crystalline, high density polymers comprises contacting an olefin such as ethylene, propylene, 1-butene and the like with a catalyst such as a mixture of a compound represented by the formula $AlR_3$ wherein R is a saturated aliphatic cycloaliphatic or aromatic hydrocarbon radical or hydrogen; and a second compound which is ordinarily a halogen compound of a metal such as titanium, zirconium, chromium or molybdenum. An example of such a catalyst is a mixture of triethylaluminum and titanium tetrachloride. A similar suitable catalyst comprises a mixture of a compound represented by the formula $R_mAlX_n$ wherein R is a hydrocarbon radical of the type previously described, X is a halogen and $m+n=3$, i.e., the valence of aluminum, and a metal compound such as titanium dioxide, tetraalkoxide of titanium and tetravalent titanium salts of organic carboxylic acids. An example of such a catalyst is a mixture of diethylaluminum chloride, ethylaluminum dichloride, and titanium tetrachloride. A similar type of catalyst mixture comprises a halide of a group IV metal, e.g., titanium tetrachloride and a free metal, such as metallic sodium or metallic magnesium. The reaction with these catalysts is preferably carried out in the presence of a hydrocarbon diluent in liquid phase at a temperature in the range of room temperature up to about 300° C. Polymers produced in the presence of these catalysis have a molecular weight in the range of 10,000 to 200,000 or higher. They generally have a crystallinity of the order of 80 to 85 percent and densities of about 0.95.

It will be noted that the foregoing specification as to density and crystallinity are not satisfied by most of the polyethylenes which have hitherto been available on the market. Most such polyethylenes have been produced by polymerizations at extremely high pressures, e.g., of the order of 10,000 p.s.i. or higher, usually in the presence of a peroxide-type catalyst or without any added catalyst. These materials ordinarily have a density of the order of 0.91 or 0.92 and crystallinities generally of 60 percent and lower. They ordinarily have molecular weights within the general range 5000 up to 30,000 and tensile strengths of the order 1500 to 2000 p.s.i. The saturation in such polymers is preponderantly of the branch-vinyl type.

It is known in the art to halogenate these high pressure polymerized polyethylenes in solution in a solvent. Of the solvents used carbon tetrachloride is frequently preferred since it is inert under the conditions of the reaction and is sufficiently low-boiling to be readily separated from the reaction product. Other solvents, however, can be employed, such as chloroform, symmetrical dichloroethane, 1,1,1-trichloroethane, ethylidene chloride, and the like. Such high pressure polyethylenes can be dissolved in carbon tetrachloride or a similar solvent under reflux conditions or even at lower temperatures and subatmospheric pressures, and halogenation can be effected in solution to give rubbery products or resinous depending upon the degree of halogenation. However, the low pressure highly crystalline polymers are not soluble in these low boiling solvents even under reflux conditions and atmospheric pressure and special techniques are employed to ensure uniform halogenation. One such process is fully described and claimed in copending application of Peter J. Canterino, Serial No. 442,891, filed July 12, 1954. According to that invention a solid polyolefin which is substantially insoluble in carbon tetrachloride and other low boiling chlorinated solvents at atmospheric pressure is subjected to halogenation with a halogenating reactant while the polymer is maintained in solution in such solvent at a temperature above the normal boiling point of the solvent and below the temperature at which the polymer begins to decompose, and a superatmospheric pressure sufficient to maintain the solvent substantially in liquid phase. The temperature employed is preferably in the range 95 to 130° C. when carbon tetrachloride is the solvent. Suitable catalysts such as peroxides and/or ultraviolet light can be employed. After the polymer contains from about 15–25 percent combined halogen, the polymer is soluble at atmospheric pressure and it is frequently preferred to lower the pressure prior to continuing halogenation. The halogenation can continue at atmospheric pressure until a polymer containing 25–70 or even 75 percent combined halogen is obtained.

A second method for halogenating these highly crystalline polymers is described and claimed in the copending application of Canterino and Baptist, Serial No. 446,666, now U.S. 2,920,064, filed July 29, 1954. In the method of that application the polymer is first dissolved in a solvent selected from the group consisting of tetrachloroethane, chlorobenzene, and dichlorobenzene wherein the polymer is halogenated until it contains 13 to 20 weight percent of combined halogen after which the partially halogenated polymer is dissolved in a low boiling solvent such as carbon tetrachloride, chloroform and ethylene chloride where it is further halogenated. In this method catalysts of the type described above can also be employed.

In still another, but non-equivalent method, halogenated 1-olefin polymers of superior physical properties can be prepared by a two-stage process comprising introducing halogen into the polymer while in solution under pressure or in one of the solvents of the first stage of Serial No. 446,666 until up to 20 percent halogen has been introduced and thereafter cooling the solution to below the temperature wherein the polymer comes out of solution and thereafter continuing the halogenation to the desired halogen content which can be up to 80 percent. This method is fully described, and claimed in the copending application of Canterino, Serial No. 700,591, filed December 4, 1957.

As has been stated, the halogenated polymers useful in this invention are polymers of high density, highly crystalline ethylene, said chlorinated polymers containing between 20 and 60 weight percent halogen selected from the group consisting of chlorine and bromine. By ethylene polymers we mean those polymers of ethylene obtained by polymerizing 1-olefin monomers comprising at least 50 weight percent ethylene and preferably at least 90 weight percent ethylene. Such polymers can be homopolymers of ethylene or ethylene with other 1-olefins such as has been enumerated above. The halogenated polymer can be a chlorinated polymer, a brominated polymer, a mixed halogenated polymer of these two halogens or a mixture of the halogenated polymers.

The halogenated ethylene polymers employed as adhesives have a halogen content in the range between 20 and 60 weight percent. They are dissolved or dispersed in any suitable solvent such as toluene, benzene, xylene, cyclohexane, methylcyclohexane, carbon tetrachloride, or chlorobenzene. Frequently they may be dissolved in the solvent used in the halogenation step. The solvent should be a material of intermediate volatility, i.e., it should evaporate at a fairly rapid rate at room temperature after application of the adhesive composition to the metal and/or polyolefin surface. The concentration of the solution or dispersion will vary depending upon the halogen content of the polymer and also upon the solvent used. It will generally contain in the range from 1 to 15, preferably from 5 to 10, weight percent of the halogenated ethylene polymer. Curatives may also be present in the composition and in many instances are preferred since their presence will ordinarily give a higher bonding strength. Fillers such as carbon black and mineral fillers may also be present.

When bonding a solid poly 1-olefin, such as polyethylene, to a metal, the metal surface is first thoroughly cleaned and the adhesive composition is applied to it and allowed to air dry. The drying is accomplished at room temperature, within the range between 60 and 90° F. A sheet of polyethylene is then placed lightly against the coated metal surface and secured by any means such as suitable clamps. The assembly is then cured at a temperature above the melting point of the polyethylene for a period generally in the range between 5 and 60 minutes, preferably between 10 and 40 minutes, depending upon the temperature. The curing temperature generally does not exceed 400° F. The minimum temperature will depend upon the melting point of the 1-olefin polymer cured.

Several runs were made to illustrate the effectiveness of this particular bonding agent for bonding a 1-olefin polymer to metal. While the ethylene polymer is used to illustrate the effectiveness of the bonding agent, this is not to be considered limiting as any of the 1-olefin polymers as indicated can be bonded to metal surfaces by the halogenated or chlorinated ethylene polymers as described.

Example I

Ethylene was polymerized in a continuous process in the presence of chromium oxide, silica-alumina catalyst utilizing a 150 gallon reactor provided with a stirrer. The diluent for the reaction was cyclohexane. The reaction conditions were as follows:

| Residence Time, hours | Polymer Concentration in reactor, Wt. Percent | Catalyst Concentration in reactor, Wt. Percent | Temperature, °F. | Pressure, p.s.i.g. |
|---|---|---|---|---|
| 1.6 | 8.8 | 0.15 | 295 | 420 |

The polyethylene produced had the following properties:

| | |
|---|---:|
| Volatiles, wt. percent | 0.0 |
| Ash, wt. percent | 0.01 |
| Density | 0.961 |
| Crystalline freezing point, °F | 253 |
| Melt index [1] | 0.493 |
| Heat distortion, °F. [2] | 200 |
| Stiffness, p.s.i. [3] | 182,000 |
| Impact strength, Izod, ft. lbs./inch notch [4] | 6.3 |
| Compression molded: [5] | |
| Tensile, p.s.i. | 4,490 |
| Elongation, percent | 22 |
| Injection molded: [6] | |
| Tensile, p.s.i. | 5,150 |
| Elongation, percent | 27 |
| Crystallinity, percent | (Magnetic nuclear resonance at 70° F. >90) |

[1] ASTM D1238–52T.
[2] ASTM D648–45T.
[3] ASTM D747–50.
[4] ASTM D256–54T.
[5] ASTM D412–51T.
[6] ASTM D638–52T.

A 10-gallon, glass-lined reactor provided with a stirrer was charged with 3-pounds of the above-described polyethylene, 75 pounds of carbon tetrachloride, and 6 grams of benzoyl peroxide. The mixture was stirred, pressured to 50 p.s.i.g. with nitrogen (reactor was not flushed with nitrogen prior to charging ingredients), and heated. When the temperature reached 155° F., introduction of chlorine was started and heating was continued to 212° F. Chlorine was added continuously from the time it was started. Total time of addition was one hour and total chlorine added was 2.35 pounds. The reactor was vented while nitrogen was passed continuously through it. The temperature had dropped to 173° F. when atmospheric pressure was reached. The product was stabilized by the addition of 3.5 parts of heat stabilizer per 100 parts of chlorinated polyethylene. The reactor contents containing the heat stabilizer were added to methanol to coagulate the chlorinated polyethylene which was then separated and dried in a vacuum oven at 210° F. for 16 hours. The product contained 30 weight percent chlorine.

Strips of steel one inch wide, 4 inches long, and 1/16 inch thick were cleaned by first dipping them into acetone to remove grease. They were then immersed in a pickling solution containing 25 percent by volume of concentrated nitric acid in ethanol and left there two minutes. Upon removal from the pickling solution, the strips were dipped into water, then into acetone, and dried.

A solution of the chlorinated polyethylene in toluene was prepared using 10 grams of the chlorined polymer per 100 cc. of toluene. This solution was brushed onto each of two of the cleaned steel strips to make a coating one inch square at one end of each strip. The coatings were allowed to air dry. A specimen one inch square was cut from a compression molded strip of highly crystalline polyethylene preferably by the method previously described, which was 1/16 inch thick. This square of polyethylene was placed between the coated metal strips which were arranged with the free ends in opposite directions. The assembly was clamped with a C clamp and heated in an air oven at 310° F. for 30 minutes. After cooling, the free ends of the steel strips were placed in the jaws of an Instron tensile machine to determine the bond strength. The test was made using a rate of strain of 0.1 inch per minute. Several such bonds were tested and the bond formed had a shear strength in the range of 500–600 p.s.i.

Example II

A test was made in the manner described in Example I except that the adhesive had the following composition:

| | Parts by weight |
|---|---:|
| Chlorinated polyethylene [1] | 100 |
| Sulfur | 2 |
| A-32 [2] | 0.5 |
| Staybelite resin [3] | 2 |
| Toluene [4] | 862 |

[1] As in Example I.
[2] Reaction product of butyraldehyde and butylidene aniline.
[3] Hydrogenated rosin.
[4] One liter.

After applying the composition to steel strips as in Example I, placing a one inch square sample of polyethylene as in Example I between the coated portions, and curing 30 minutes at 310° F. Several such strips were tested and the bond gave a shear strength in the range of 800–900 p.s.i.

Having described our invention, we claim:

1. A method for bonding a 1-olefin polymer to metal, said 1-olefin polymer being produced by polymerizing 1-olefins having from 2 to 8 carbon atoms per molecule, which comprises coating said metal with an adhesive composition consisting essentially of a halogenated ethylene polymer containing 20 to 60 weight percent combined halogen selected from the group consisting of chlorine and bromine, said ethylene polymer having a crystallinity at least 70 percent and a density of at least 0.94 and having been prepared by polymerizing 1-olefins comprising at least 50 weight percent ethylene; applying the 1-olefin polymer to be bonded to the coated surface and thereafter curing the assembly at a temperature above the melting point of the polymer being bonded and not over about 400° F.

2. A method for bonding a 1-olefin polymer to metal, said 1-olefin polymer being produced by polymerizing 1-olefins having from 2 to 8 carbon atoms per molecule, which comprises coating said metal with a volatile solvent solution containing from 1 to 15 weight percent of a halogenated ethylene polymer dissolved therein, said halogenated ethylene polymer being the product of halogenation of a high density, highly crystalline ethylene polymer containing 20 to 60 weight percent combined halogen selected from the group consisting of chlorine and bromine, said ethylene polymer being the polymerized product of polymerizing 1-olefins comprising at least 80 weight percent ethylene; applying the 1-olefin polymer to be bonded to the coated surface; and thereafter heating the assembly at a temperature above the melting point of the 1-olefin polymer and not over about 400° F. until cured.

3. A method of bonding a sheet of 1-olefin polymer to metal, said 1-olefin polymer being produced by polymerizing 1-olefins having from 2 to 8 carbon atoms per molecule, which comprises preparing a solution of a chlorinated highly crystalline, high-density ethylene polymer containing 20 to 60 weight percent combined chlorine in a volatile solvent to a concentration in the range 1–15 weight percent, said highly crystalline, high density polymer being the polymerized product of 1-olefins comprising at least 50 weight percent ethylene and having a density of at least 0.94 and a crystallinity of at least 70 percent; coating said metal wtih the resulting solution; drying the metal; applying said sheet of polymer to the coated surface; and thereafter heating the assembly at a temperature of at least the melting point of the 1-olefin polymer and not above about 400° F. until cured.

4. The method of claim 3 wherein the ethylene polymer is the product resulting from polymerizing 1-olefins comprising at least 90 weight percent ethylene.

5. The method of claim 4 wherein the concentration of chlorinated polymer in solvent is in the range 5–10 weight percent and the assembly is heated for a period of time in the range 5 to 60 minutes.

6. The method of claim 3 wherein the 1-olefin polymer being bonded is polyethylene and the chlorinated polymer is chlorinated polyethylene, the last said polyethylene having a crystallinity of at least 90 percent and a density of at least 0.95.

7. The method of claim 6 wherein the solvent is toluene.

8. A laminated product which consists of a metal base, a sheet of a 1-olefin polymer, and an interposed adhesive layer consisting essentially of a halogenated highly crystalline, high density ethylene polymer containing 20 to 60 weight percent combined halogen selected from the group consisting of chlorine and bromine bonding said sheet to said base, said ethylene polymer having a crystallinity of at least 70 percent and a density of at least 0.94 and having been prepared by polymerizing 1-olefins comprising at least 80 weight percent ethylene, said 1-olefin polymer being produced by polymerizing 1-olefins having from 2 to 8 carbon atoms per molecule.

9. A laminated product according to claim 8 in which the 1-olefin polymer is a sheet of polyethylene.

References Cited in the file of this patent

UNITED STATES PATENTS

| | | |
|---|---|---|
| 2,398,803 | Myles et al. | Apr. 23, 1946 |
| 2,480,008 | Anderson | Aug. 23, 1949 |
| 2,480,295 | Kent et al. | Aug. 20, 1949 |
| 2,543,229 | Chapman | Feb. 27, 1951 |
| 2,581,920 | Kuhn | Jan. 8, 1952 |
| 2,606,852 | Kraus et al. | Aug. 12, 1952 |
| 2,622,056 | De Coudres et al. | Dec. 16, 1952 |